(12) United States Patent
Aoki

(10) Patent No.: US 9,285,483 B2
(45) Date of Patent: *Mar. 15, 2016

(54) LOCATION CALCULATING METHOD AND LOCATION CALCULATING DEVICE

(71) Applicant: Seiko Epson Corporation, Tokyo (JP)

(72) Inventor: Naganobu Aoki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 155 days.

This patent is subject to a terminal disclaimer.

(21) Appl. No.: 13/962,880

(22) Filed: Aug. 8, 2013

(65) Prior Publication Data

US 2013/0342392 A1    Dec. 26, 2013

Related U.S. Application Data

(63) Continuation of application No. 13/081,376, filed on Apr. 6, 2011, now Pat. No. 8,552,909.

(30) Foreign Application Priority Data

Apr. 8, 2010    (JP) ................................ 2010-089270

(51) Int. Cl.
*G01S 19/45* (2010.01)
*G01S 19/42* (2010.01)
*G01S 19/47* (2010.01)
*G01C 21/16* (2006.01)
(Continued)

(52) U.S. Cl.
CPC ............... *G01S 19/47* (2013.01); *G01C 21/165* (2013.01); *G01S 13/34* (2013.01); *G01S 19/14* (2013.01); *G01S 19/49* (2013.01)

(58) Field of Classification Search
USPC ............... 342/357.2, 357.25, 357.28, 357.71; 701/469, 470
See application file for complete search history.

(56) References Cited

U.S. PATENT DOCUMENTS 6,810,329 B2    10/2004 Koga
8,552,909 B2 *  10/2013 Aoki ........................ 342/357.28
(Continued)

FOREIGN PATENT DOCUMENTS

JP    07-307913 A    11/1995
JP    2001-305207 A    10/2001
(Continued)

OTHER PUBLICATIONS

Tsuchiya et al., "New edition Easy GPS survey", published by Japan Association of Surveyors. pp. 403, 408-409. (1997).

*Primary Examiner* — Dao Phan
(74) *Attorney, Agent, or Firm* — Kilpatrick Townsend & Stockton LLP

(57) ABSTRACT

A location calculating method includes acquiring measurement information by receiving satellite signals from positioning satellites and storing the acquired measurement information in a storage unit in association with acquisition time, calculating movement information that includes a movement direction and a movement distance by using a detection result of a sensor unit that at least includes an acceleration sensor and storing the calculated movement information in the storage unit in association with calculation time, and calculating a location at desired time by using at least the measurement information of which the acquisition time satisfies a predetermined proximity time condition and the movement information of which the calculation time is between the acquisition time of the measurement information and the given desired time.

9 Claims, 13 Drawing Sheets

(51) Int. Cl.
*G01S 13/34* (2006.01)
*G01S 19/14* (2010.01)
*G01S 19/49* (2010.01)

(56) References Cited

U.S. PATENT DOCUMENTS

2005/0071081 A1  3/2005  Hirose et al.
2007/0018889 A1  1/2007  Kurata
2010/0125414 A1  5/2010  Okuyama et al.

FOREIGN PATENT DOCUMENTS

JP  2007-024832 A  2/2007
JP  2007-166056 A  6/2007
JP  2009-229065 A  10/2009

* cited by examiner

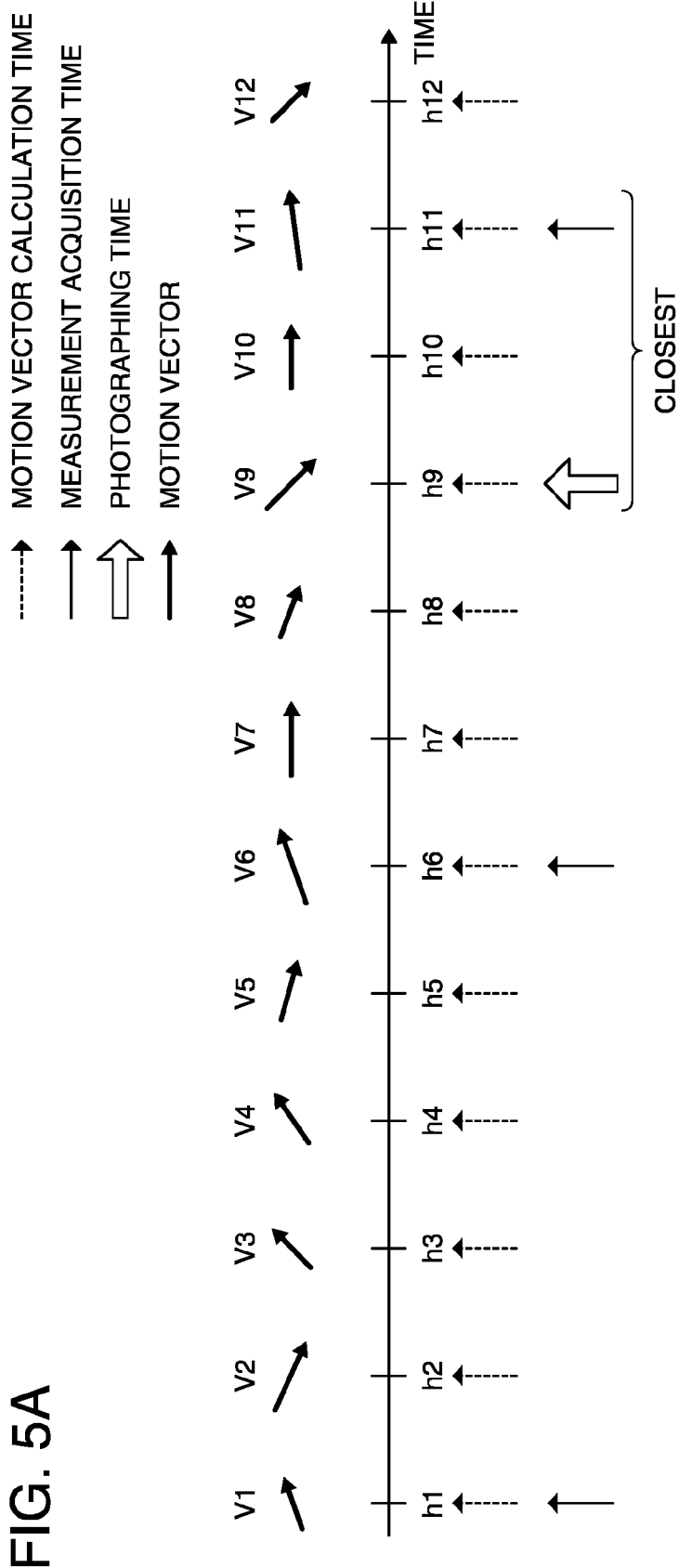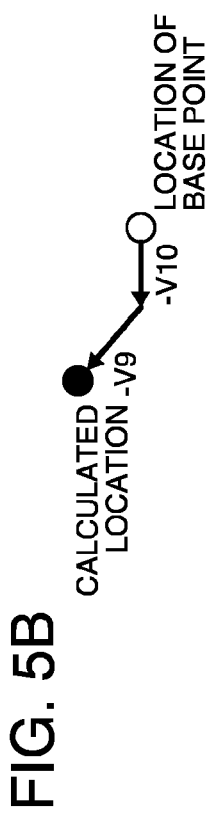
FIG. 5A
FIG. 5B

95

| | 951 | 953 | 955 | 957 |
|---|---|---|---|---|
| | DETECTION TIME | ACCELERATION | ANGULAR VELOCITY | AZIMUTH |
| | t1 | (Ax1,Ay1,Az1) | (ωx1,ωy1,ωz1) | θ1 |
| | t2 | (Ax2,Ay2,Az2) | (ωx2,ωy2,ωz2) | θ2 |
| | t3 | (Ax3,Ay3,Az3) | (ωx3,ωy3,ωz3) | θ3 |
| | ⋮ | ⋮ | ⋮ | ⋮ |

OLD ↑ NEW ↓

| | 961 | 963 |
|---|---|---|
| | CALCULATED TIME | MOTION VECTOR |
| | t10 | (Vx1,Vy1,Vz1) |
| | t20 | (Vx2,Vy2,Vz2) |
| | t30 | (Vx3,Vy3,Vz3) |
| | ⋮ | ⋮ |

OLD ↑ NEW ↓

FIG. 7

| DATA FILE NAME | PHOTOGRAPHING DATE AND TIME | PHOTOGRAPHING DIRECTION | CALCULATED LOCATION | FACILITY NAME |
|---|---|---|---|---|
| f1 | 2010/3/20 14:25:30 | φ1 | (X1,Y1,Z1) | ○○TEMPLE |
| f2 | 2010/3/20 14:34:53 | φ2 | (X2,Y2,Z2) | ○○TEMPLE |
| f3 | 2010/3/21 16:15:16 | φ3 | (X3,Y3,Z3) | ××PARK |
| ... | ... | ... | ... | ... |

FIG. 9

LOCATION CALCULATING METHOD AND LOCATION CALCULATING DEVICE

CROSS REFERENCES TO RELATED APPLICATIONS

This application is a continuation of U.S. patent application Ser. No. 13/081,376, filed Apr. 6, 2011, which claims priority to Japanese Patent Application No. 2010-089270, filed Apr. 8, 2010, the entireties of which are incorporated by reference herein.

BACKGROUND

1. Technical Field

The present invention relates to a location calculating method and a location calculating device.

2. Related Art

As a positioning system using a positioning signal, a GPS (Global Positioning System) is widely known and is used for a location calculating device that is built in a cellular phone or a navigation device, or the like. In the GPS, a location calculating process is performed in which the coordinates of the location and the clock error of the location calculating device are acquired based on information including the locations of a plurality of GPS satellites, a pseudo distance from each GPS satellite to the location calculating device, and the like.

The location calculating device is also used by being built in various electronic apparatuses other than the electronic apparatuses such as the cellular phone and the car navigation device. For example, a technology is contrived in which photographed image data and positional information data are recorded in association with each other, for example, in a digital camera in which the location calculating device is built (for example, JP-A-7-307913).

In order to perform location calculation using the GPS, satellite orbit data of GPS satellites is necessary. However, when positioning is started in the state in which the satellite orbit data is not stored, that is, in a so-called cold start state or the like, a predetermined time interval is necessary for acquiring the satellite orbit data from the GPS satellites. On the other hand, for example, in a case where the above-described digital camera is used, the photographing process is completed in a short time. Accordingly, there is a problem in terms of time for completing the location calculating process at photographing time. When the process is similarly considered for other electronic apparatuses, there is a problem in terms of time for completing the location calculating process at given desired time.

SUMMARY

An advantage of some aspects of the invention is that it provides a technology capable of calculating a location at desired time in the past at later time.

According to a first aspect of the invention, there is provided a location calculating method including: acquiring measurement information by receiving satellite signals from positioning satellites and storing the acquired measurement information in a first storage unit in association with acquisition time; calculating movement information that includes a movement direction and a movement distance by using a detection result of a sensor unit that at least includes an acceleration sensor and storing the calculated movement information in a second storage unit in association with calculation time; and calculating a location at desired time by using at least the measurement information of which the acquisition time satisfies a predetermined proximity time condition and the movement information of which the calculation time is between the acquisition time of the measurement information and the given desired time.

In addition, as another aspect of the invention, there is provided a location calculating device including: a first process performing unit that acquires measurement information by receiving satellite signals from positioning satellites and stores the acquired measurement information in a first storage unit in association with acquisition time; a second process performing unit that calculates movement information that includes a movement direction and a movement distance by using a detection result of a sensor unit that at least includes an acceleration sensor and stores the calculated movement information in a second storage unit in association with calculation time; and a location calculating unit that calculates a location at desired time by using at least the measurement information of which the acquisition time satisfies a predetermined proximity time condition and the movement information of which the calculation time is between the acquisition time of the measurement information and the given desired time.

According to this first aspect or the like, the measurement information is acquired by receiving satellite signals from positioning satellites, and the acquired measurement information is stored in the first storage unit in association with the acquisition time. The measurement information is information that is needed for calculating a location. Meanwhile movement information is calculated by using a detection result of the sensor unit that includes at least an acceleration sensor, and the calculated movement information is stored in the second storage unit in association with the calculation time. By using the measurement information and the movement information that are stored in advance, calculation of the location at arbitrary desired time in the past at later time can be realized.

As a second aspect of the invention, in the location calculating method according to the first aspect of the invention, the calculating of a location may include calculating the location at the desired time by acquiring a location of a base point by using the measurement information of which the acquisition time satisfies the proximity time condition and calculating a relative location with respect to the location of the base point by using the movement information.

According to the second aspect of the invention, the location of the base point is acquired by using the measurement information of which the acquisition time satisfies the proximity time condition. Then, the location at desired time is calculated by calculating a relative location with respect to the location of the base point by using the movement information that is stored in the second storage unit.

In addition, as a third aspect of the invention, in the location calculating method according to the first or second aspect of the invention, the calculating of a location may include reading out the measurement information from the first storage unit with the acquisition time immediately before or immediately after the desired time being set as the proximity time condition.

In the third aspect of the invention, by reading out the measurement information from the first storage unit with the acquisition time immediately before or immediately after the desired time being set as the proximity time condition, the location at the desired time can be acquired by using the measurement information acquired at the acquisition time that is close to the desired time.

As a fourth aspect of the invention, in the location calculating method according to the first or second aspect of the invention, the calculating of a location may include reading out the measurement information that satisfies a predetermined high reliability condition from the first storage unit as the measurement information of which the acquisition time satisfies the proximity time condition.

According to the fourth aspect of the invention, as the measurement information of which the acquisition time satisfies the proximity time condition, measurement information that satisfies a predetermined high reliability condition is read out from the first storage unit. By reading out the measurement information having high reliability from the first storage unit and using the read-out measurement information for calculating the location, the precision of location calculation can be improved.

In addition, as a fifth aspect of the invention, in the location calculating method according to any of the first to fourth aspects of the invention, the desired time may be time at which a predetermined photographing process is performed.

According to the fifth aspect of the invention, for example, in an electronic apparatus having a photographing function, the location of the electronic apparatus at the time of performing a photographing process can be appropriately acquired.

In addition, as a sixth aspect of the invention, in the location calculating method according to any of the first to fifth aspects of the invention, acquiring GPS Precise Ephemeris may be further included, wherein the positioning satellites are the GPS satellites, and the calculating of a location is calculating the location by using the GPS Precise Ephemeris.

The GPS Precise Ephemeris is precise data relating to the satellite orbit of the GPS satellite in the past. According to the sixth aspect of the invention, by acquiring the GPS Precise Ephemeris and using the acquired GPS Precise Ephemeris for calculating the location, the location at desired time can be acquired more precisely.

BRIEF DESCRIPTION OF THE DRAWINGS

The invention will be described with reference to the accompanying drawings, wherein like numbers reference like elements.

FIG. 5A is a conceptual diagram of time and motion vectors.

FIG. 5B is a schematic diagram illustrating location calculation.

FIG. 6 is a diagram showing an example of the data configuration of sensor data.

FIG. 7 is a diagram showing an example of the data configuration of motion vector data.

FIG. 9 is a diagram showing an example of the data configuration of a photographed image DB.

DESCRIPTION OF EXEMPLARY EMBODIMENTS

Hereinafter, an embodiment of a location calculating system that is a system calculating the location of a digital camera as one type of an electronic device will be described with reference to the accompanying drawings. However, it is apparent that an embodiment to which the invention can be applied is not limited to the embodiment described below.

1. System Configuration

Figure 1:
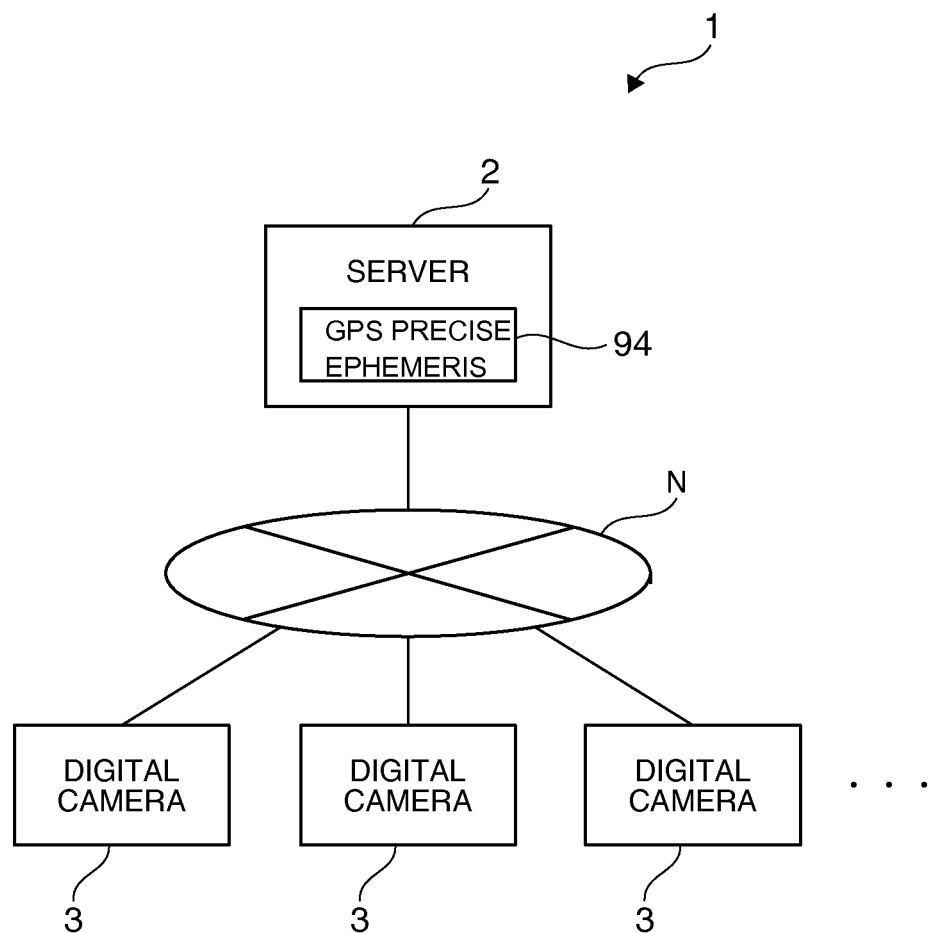
FIG. 1 is a diagram showing an example of the system configuration of a location calculating system.

FIG. 1 is a diagram showing an example of the system configuration of a location calculating system 1 according to this embodiment. The location calculating system 1 includes a server 2 and digital cameras 3 and is configured by interconnecting the server 2 and the digital cameras 3 to be communicable through a network N.

The server 2 is a sever with which the digital cameras 3 can communicate through the network N and maintains a GPS Precise Ephemeris 94 of GPS satellites. The GPS Precise Ephemeris 94 is precise satellite orbit data that includes an actual location that is an actual location of a GPS satellite and an actual clock error that is an actual error of an atomic clock installed to the GPS satellite and is data that is generated and provided by a U.S. geodesic agency, an international GPS (Global Positioning System) service, or the like by actually observing GPS satellites. The server 2 is a private or public computer system that provides the GPS Precise Ephemeris or a computer system that acquires the GPS Precise Ephemeris occasionally or regularly from such a computer system.

The digital camera 3 is an electronic device that is configured so as to record an image photographed by a photographing device as digital data and perform displaying, printing, or the like for the photographed image in accordance with a user's operation. In this embodiment, the digital camera 3 has a GPS function and performs a process of acquiring measurement information as various amounts used for location calculation by receiving a GPS satellite signal that is transmitted from a GPS satellite.

The GPS satellite signal is a communication signal of 1.57542 [GHz] that is modulated by a CDMA (Code Division Multiple Access) method known as a spread spectrum method by using a CA (Coarse and Acquisition) code as one type of a spread code. The CA code is a pseudo random noise code, which has a code length of 1023 chips to 1PN frame, having a repetition period of 1 ms differing for each GPS satellite.

In this embodiment, two types of information including a code phase that is the phase of a CA code of a received GPS satellite signal (hereinafter, referred to as a "received CA code") and a reception frequency that is the frequency of the received GPS satellite signal are included in the measurement information. The digital camera 3 intermittently performs a process (a first process) of acquiring the measurement information by intermittently operating a built-in GPS receiver and storing the measurement information in a storage unit.

In this embodiment, the digital camera 3 includes a sensor unit that has an inertial sensor such as an acceleration sensor or a gyro sensor. Then, the digital camera 3 continuously performs a process (a second process) of calculating a motion vector configured by a movement direction and a movement distance of the digital camera 3 using a detection result of the sensor unit and storing the calculated motion vector in the storage unit in association with calculated time. Thereafter, the digital camera 3 calculates the location of the digital camera 3 at photographed time (desired time) in the past by using the measurement information that has been intermittently acquired and stored and the motion vectors that have been continuously calculated and stored, at an arbitrary timing after photographing.

2. Functional Configuration

Figure 2:
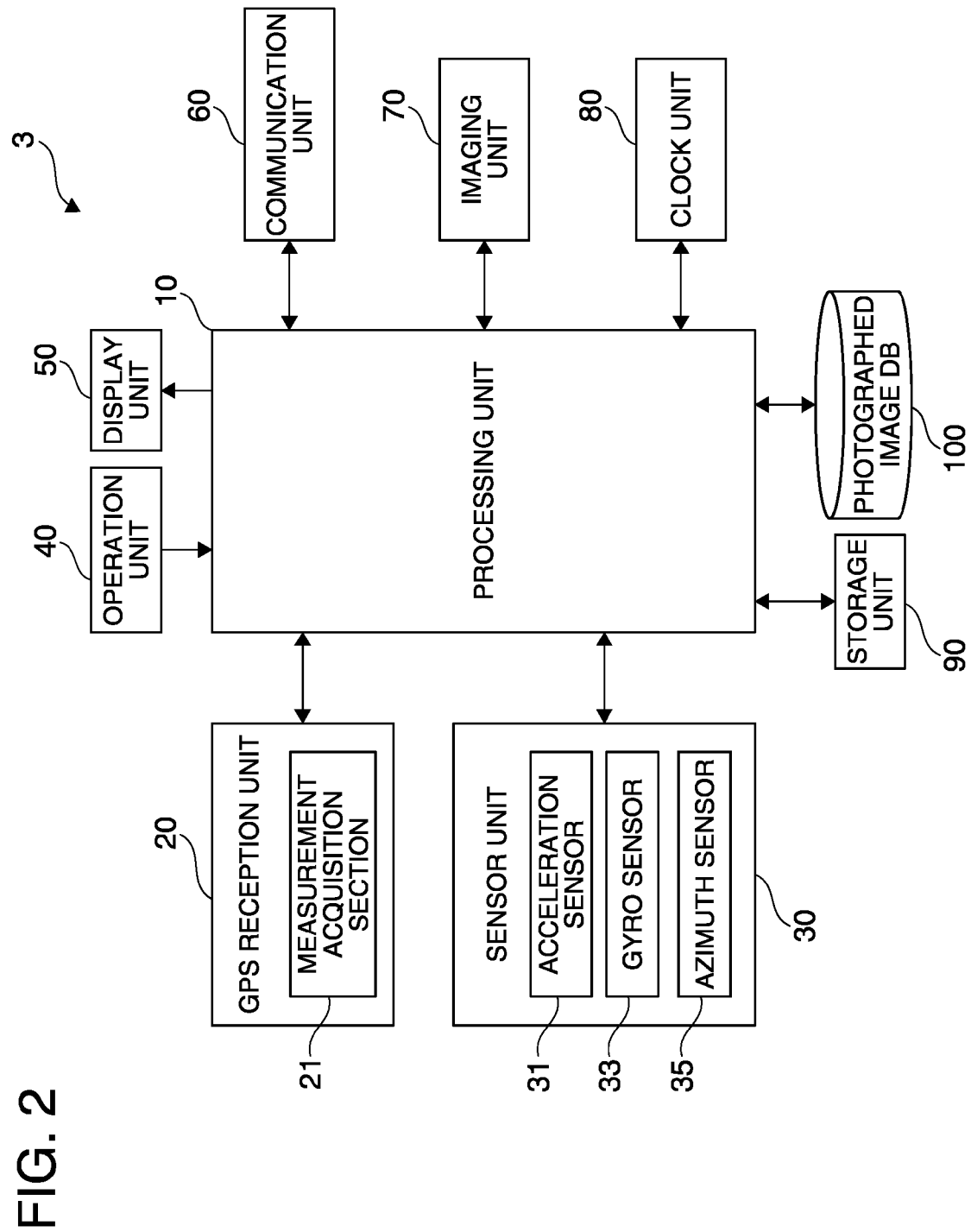
FIG. 2 is a block diagram showing an example of the functional configuration of a digital camera.

FIG. 2 is a block diagram showing an example of the functional configuration of the digital camera 3. The digital camera 3 is configured to include a processing unit 10, a GPS reception unit 20, a sensor unit 30, an operation unit 40, a display unit 50, a communication unit 60, an imaging unit 70, a clock unit 80, a storage unit 90, and a photographed image DB (Database) 100.

The processing unit 10 is a control device that overall controls each unit of the digital camera 3 in accordance with various programs such as a system program and the like that are stored in the storage unit 90 and is configured to include a processor such as a CPU (Central Processing Unit). In order to realize the basic functions of the digital camera 3, the processing unit 10 performs a photographing process of allowing the imaging unit 70 to photograph an image in the front direction of the digital camera 3 or a process of displaying the photographed image on the display unit 50 in accordance with an instructing operation input through the operation unit 40.

In addition, in order to realize the location calculating function in the digital camera 3, the processing unit 10 performs the processes as below. The processing unit 10 intermittently performs a process (the first process) of storing the measurement information acquired by the GPS reception unit 20 in the storage unit 90 in association with the acquisition time. In addition, the processing unit 10 continuously performs a process (the second process) of calculating a motion vector that represents the movement direction and the movement distance of the digital camera 3 using the detection result of the sensor unit 30 and storing the calculated motion vector in the storage unit 90 in association with the calculation time. Then, the processing unit 10 performs a process of calculating the location of the digital camera 3 at the time (desired time) when a photographing process is performed by using the measurement information and the motion vector, which are stored in the storage unit 90, at later time.

The GPS reception unit 20 is a location calculating circuit or a location calculating device that measures the location of the digital camera 3 based on a GPS satellite signal received by a GPS antenna not shown in the figure and is a functional block corresponding to a so-called GPS receiver. Although not shown in the figure, the GPS reception unit 20 is configured to include an RF reception circuit section and a baseband processing circuit section. The RF reception circuit section and the baseband processing circuit section may be manufactured as separate LSI (Large Scale Integration) chips or be manufactured as one chip.

The GPS reception unit 20 includes a measurement acquisition section 21 that acquires the measurement information by picking up a GPS satellite signal from received signals, as a functional unit. The measurement acquisition section 21 picks up the GPS satellite signal by calculating the correlation between the received CA code as a spread code of the received GPS satellite signal and a replica CA code that is a pseudo CA code generated inside the device. At this time, in order to specify the reception frequency of the GPS satellite signal, the GPS reception unit 20 calculates the correlation between the received CA code and the replica CA code while changing a search frequency for specifying the reception frequency of the GPS satellite signal.

In addition, the measurement acquisition section 21 calculates the correlation while changing the phase (code phase) of the replica CA code by which the received CA code is multiplied. The measurement acquisition section 21 detects a reception frequency and a code phase at which a correction value calculated through correlation calculation becomes a maximum and outputs the reception frequency and the code phase, that have been detected, to the processing unit 10 as the measurement information. The reception frequency included in the measurement information is mainly used for picking up a GPS satellite signal or calculation of the speed of the digital camera 3. Further, the code phase is mainly used for calculating the location of the digital camera 3.

The sensor unit 30 is configured to include an inertial sensor that is used for detecting the movement state of the digital camera 3 and, for example, includes an acceleration sensor 31, a gyro sensor 33, and an azimuth sensor 35.

The acceleration sensor 31 is a sensor that detects the acceleration of the digital camera 3 and may be a strain gauge type or a piezoelectric type. In addition, the acceleration sensor 31 may be an MEMS (Micro Electro Mechanical Systems) sensor. The gyro sensor 33 is a sensor that detects the angular velocity of the digital camera 3 and is set to be arranged to have the same axial direction as that of the acceleration sensor 31.

The acceleration sensor 31 and the gyro sensor 33 are designed so as to detect and output the acceleration in the direction of each axis of the orthogonal three axes of the sensor coordinate system, which is a local coordinate system determined in correspondence with the sensors in advance, and the angular velocity around each axis. Here, the acceleration sensor 31 and the gyro sensor 33 may be independent sensors or an integrated sensor.

The azimuth sensor 35 is a sensor that detects the movement direction of the digital camera 3 and, for example, is configured to include a geomagnetic sensor. The geomagnetic sensor is a so-called electronic compass and is a sensor configured to detect the northern azimuth by detecting the geomagnetism.

The operation unit 40 is an input device that is configured, for example, by a touch panel, button switches, or the like and outputs a signal corresponding to a pressed key or button to the processing unit 10. Through the operation of the operation unit 40, various instructing operations such as a photographing instructing operation, a photographed image listing instructing operation, or a photographed place analyzing instructing operation are performed.

The display unit 50 is configured by an LCD (Liquid Crystal Display) or the like and is a display device that performs various displays based on a display signal input from the processing unit 10. On the display unit 50, a finder image, a photographed image, or the like is displayed.

The communication unit 60 is a communication device that is used for communicating with the server 2 or another digital camera 3 in accordance with an instruction signal transmitted from the processing unit 10. This function is realized, for example, by a wireless LAN according to IEEE 802.11, a wireless communication module or the like of Bluetooth (registered trademark), or the like.

The photographing unit 70 is a circuit unit that captures an image in the front direction (the direction in which the lens faces) of the digital camera 3 in accordance with an instruction signal transmitted from the processing unit 10 and is configured to include an imaging device such as a CCD (Charge Coupled Device) image sensor.

The clock unit 80 is an internal clock of the digital camera 3 and outputs the measured time to the processing unit 10. Due to measured time error, the measured time of the clock unit 80 deviates from the correct time as time elapses. Accordingly, the clock unit 80 is adjusted so as to measure correct time by correcting the measured time error of the clock unit 80 by using the measurement error that is calculated through the location calculation. The processing unit 10 determines the time of acquisition of the measurement information, the time of calculation of a motion vector, or photographing time based on the measured time of the clock unit 80.

The storage unit 90 is configured by memory devices such as a ROM (Read Only Memory), a flash ROM, a RAM (Random Access Memory) and the like and stores therein a system program of the digital camera 3, various programs and data for realizing various functions such as a photographing function, a photographed image displaying function, and a photographed place analyzing function, and the like. In addition, the storage unit 90 has a work area that is used for temporarily storing data in the middle of the process of various processes, the process results, and the like.

The photographed image DB 100 is a database in which images photographed by performing a photographing process using the processing unit 10 are accumulatively stored.

3. Configuration of Data

Figure 3:
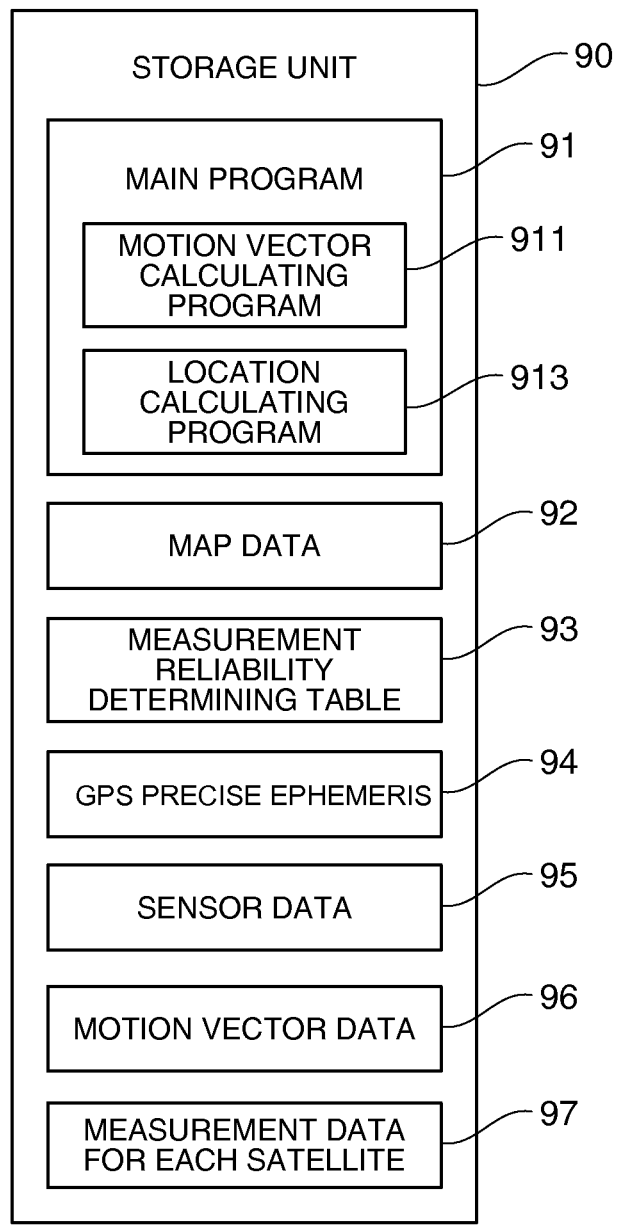
FIG. 3 is a diagram showing an example of the data configuration of a storage unit.

FIG. 3 is a diagram showing an example of the data stored in the storage unit 90. In the storage unit 90, a main program 91 that is read out by the processing unit 10 and is performed as a main process (see FIGS. 10 and 11) is stored as a program. In addition, in the main program 91, a motion vector calculating program 911 that is performed as a motion vector calculating process (see FIG. 12) and a location calculating program 913 that is performed as a location calculating process (see FIG. 13) are included as subroutines.

As the main process, a process of analyzing a photographed place based on the location calculated through the location calculating process is included, in addition to the processes for performing basic functions of the digital camera 3 such as a photographing function or a photographed image displaying function that is performed by the processing unit 10. After the photographed place is analyzed, the processing unit 10 stores information of the analyzed photographed place and the like in the photographed image DB 100 in association with a photographed image and displays the information of the photographed place and the like on the display unit 50 in the photographed image displaying process.

The motion vector calculating process is a process in which the processing unit 10 continuously calculates a motion vector representing the movement direction and the movement distance of the digital camera 3 using the detection result of the sensor unit 30 and stores the calculated motion vector in the storage unit 90 in association with the calculated time.

In addition, the location calculating process is a process in which the processing unit 10 calculates the location of the digital camera 3 at the time (photographing time) of performing a photographing process using the measurement information and the motion vector that are accumulatively stored in the storage unit 90, at later time.

Figure 4A:
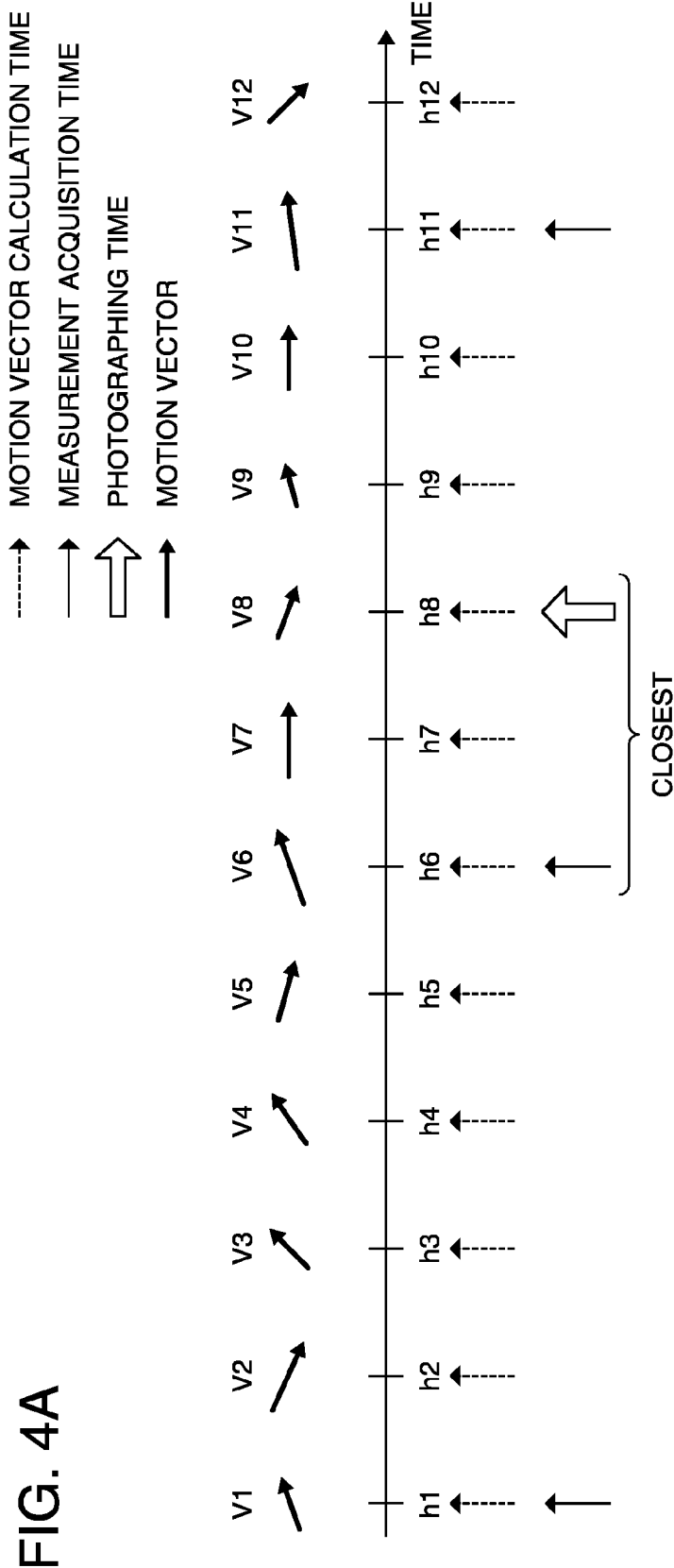
FIG. 4A is a conceptual diagram of time and motion vectors.

The location calculating process according to this embodiment will be described with reference to FIGS. 4A, 4B, 5A, and 5B. FIG. 4A is a diagram schematically showing various moments of time and motion vectors. In FIG. 4A, the horizontal axis represents the time. A dotted-line arrow shown below the time axis represents the calculation time of a motion vector, a solid-line arrow represents the acquisition time of the measurement information, and a white arrow represents the photographing time. In addition, a thick solid-line arrow shown above the time axis represents a motion vector that is calculated at the calculation time in accordance with the direction and the length thereof and is illustrated as a vector that represents the movement state from the calculation time to the next calculation time.

In this embodiment, it is assumed that the calculation time interval of the motion vectors is shorter than the acquisition time interval of the measurement information in the description. In FIG. 4A, twelve moments of time h1 to h12 are shown, and it is assumed that the calculation of the motion vector is performed every one moment of time, and the acquisition of the measurement information is performed every five moments of time in the description.

In addition, it is assumed that the photographing process is performed at time h8. The photographing time is "h8". First, the measurement acquisition time that is closest to the photographing time h8 is determined. As shown in FIG. 4A, before and after the photographing time h8, there are two moments of time h6 and h11 as the measurement acquisition time. However, since time h6 is the closest to the photographing time h8 in time, the time h6 is determined as the closest measurement acquisition time. In this case, the location calculating process is performed by using the measurement information acquired at the measurement acquisition time h6.

The location calculation can be realized by performing known convergence calculation, for example, using the method of least squares or a Kalman filter using pseudo distances between the digital camera 3 and the GPS satellites. The pseudo distance is calculated as below. The integer part of the pseudo distance is calculated by using precise satellite locations of the GPS satellites, which are calculated based on the GPS Precise Ephemeris 94 acquired from the server 2, and the latest calculated location of the digital camera 3. In addition, the fractional part of the pseudo distance is calculated by using the code phase that is included in the measurement information. By adding the integer part and the fractional part that are acquired as above, the pseudo distance is acquired.

Figure 4B:
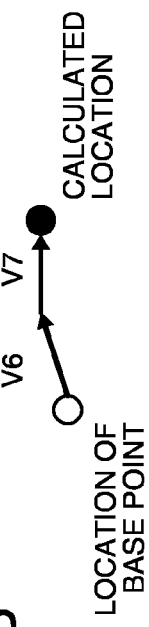
FIG. 4B is a schematic diagram illustrating location calculation.

Thereafter, the location of the digital camera 3 at measurement acquisition time h6 calculated through the location calculating process is set as the location of a base point, and the location of the digital camera 3 at photographing time h8 is calculated by using the motion vectors calculated from measurement acquisition time h6 to the photographing time h8. To be more specific, as shown in FIG. 4B, the calculated location at the measurement acquisition time h6 is set as the location of the base point, and by shifting the location of the base point based on the movement directions and the movement distances denoted by a motion vector V6 at the calculation time h6 and a motion vector V7 at the calculation time h7, the location at the photographing time h8 is calculated.

FIGS. 5A and 5B are diagrams illustrating another example of the location calculating process. The diagrams can be understood in the same manner as that in FIGS. 4A and 4B. Here, it is assumed that the photographing time is "h9" in the description. First, the measurement acquisition time that is closest to the photographing time h9 is determined. As shown in FIG. 5A, before and after the photographing time h9, there are two moments of time h6 and h11 as the measurement acquisition time. However, the measurement acquisition time that is the closest to the photographing time h9 in time is time h11. In this case, the location calculating process is performed by using the measurement information acquired at the measurement acquisition time h11.

Thereafter, the location of the digital camera 3 at the measurement acquisition time h11 is set as the location of the base point, and the location of the digital camera 3 at photographing time h9 is calculated by using the motion vectors calculated from the photographing time h9 to measurement acquisition time h11. To be more specific, as shown in FIG. 5B, the calculated location at the measurement acquisition time h11 is set as the location of the base point, and by shifting the location of the base point based on the movement directions and the movement distances denoted by a motion vector −V9 that is acquired by inversion of the motion vector V9 at the calculation time h9 and a motion vector −V10 that is acquired by inversion of the motion vector V10 at the calculation time h10, the location at photographing time h9 is calculated.

Returning back to the description of the data configuration presented with reference to FIG. 3, map data 92, a measurement reliability determining table 93, the GPS Precise Ephemeris 94, sensor data 95, motion vector data 96, and measurement data 97 for each satellite are stored in the storage unit 90. The storage unit 90 includes a storage area (a first storage section) in which the measurement information is stored in association with the acquisition time and a storage area (a second storage area) in which a motion vector is stored in association with the calculation time.

The map data 92 is a database in which various facilities such as a station, a park, a temple, and a shopping mall are registered in association with the location coordinates. The map data 92 is used for analyzing the photographed location by the processing unit 10.

The measurement reliability determining table 93 is a table that is used for determining an index value (hereinafter, referred to as "measurement reliability") representing the reliability of the measurement information that is acquired by the measurement acquisition section 21. The measurement reliability is represented, for example, as a value in the range of "0" to "1". Here, "0" represents the lowest reliability of the measurement information, and "1" represents the highest reliability of the measurement information.

The measurement reliability can be determined from various viewpoints. For example, the measurement reliability can be determined based on the signal strength of a GPS satellite signal that is received from a GPS satellite. As the signal strength of a received signal increases, the power of a correlation value acquired through correlation calculation increases, and thus the precision of the peak detection (satellite signal pick-up) of the correlation value increases. Accordingly, as the signal strength of a received signal increases, it can be determined that the reliability of the acquired measurement information increases. Therefore, a condition that the signal strength of a received signal and the measurement reliability have positive correlation may be defined. Alternatively, the measurement reliability may be determined from a different viewpoint. As will be described later in a modified example, for example, the measurement reliability is determined based on the elevation angle of a GPS satellite, and the reliability of measurement information having a higher elevation angle is determined to be higher.

The GPS Precise Ephemeris 94 is data relating to a precise satellite orbit of each GPS satellite and is data acquired from the server 2 through the communication unit 60. As the GPS Precise Ephemeris 94, for example, the actual location and the actual clock error of each GPS satellite for a predetermined period are stored in a time series.

The sensor data 95 is data in which the detection results of the sensor unit 30 are stored in a time series. An example of the data configuration of the sensor data 95 is shown in FIG. 6. As the sensor data 95, acceleration 953 along three axes that is detected by the acceleration sensor 31, angular velocity 955 around the three axes that is detected by the gyro sensor 33, and an azimuth 957 that is detected by the azimuth sensor 35 are stored in association with the detection time 951 of the sensor unit 30.

The motion vector data 96 is data in which motion vectors representing the movement states of the digital camera 3 are stored in a time series, and an example of the data configuration thereof is shown in FIG. 7. As the motion vector data 96, components of the motion vector 963, for example, in an orthogonal coordinates system are stored in a time series in association with the calculation time 961 of the motion vector. The detection time interval of the sensor unit 30 is shorter than the calculation time interval of the motion vectors. Accordingly, one motion vector is calculated in accordance with data corresponding to a predetermined number of times (for example, ten times) of detection of the sensor unit 30.

Figure 8:
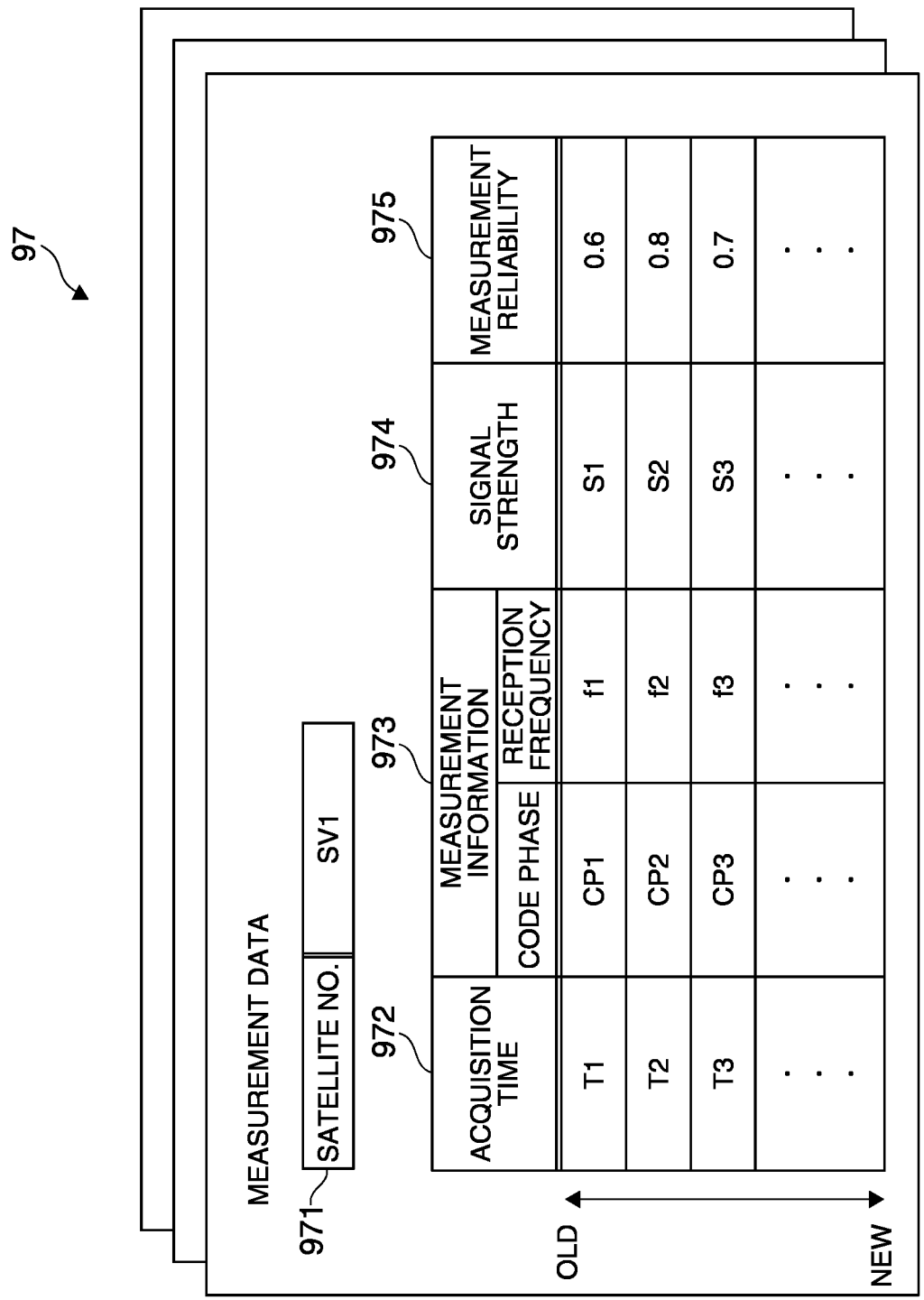
FIG. 8 is a diagram showing an example of the data configuration of measurement data for each satellite.

The measurement data 97 for each satellite is data in which measurement information acquired by the measurement acquisition section 21 is stored for each GPS satellite, and an example of the data configuration thereof is shown in FIG. 8. As the measurement data 97 for each satellite, measurement data that is formed by acquisition time 972 of measurement information, the measurement information 973, the signal strength 974 of a received signal, and measurement reliability 975 is stored in association with a GPS satellite number 971.

In this embodiment, it is assumed that the measurement acquisition section 21 is designed and configured so as to acquire the measurement information at a time interval that is longer than the calculation time interval of motion vectors in the description. In other words, the time interval of the acquisition time 972 of the measurement information is longer than the time interval of the calculation time 961 of the motion vector data 96.

In the measurement information 973, a code phase that is the phase of a CA code (received CA code) received from the GPS satellite and a reception frequency that is a frequency at a time when a GPS satellite signal is received from a GPS satellite. The signal strength 974 is the strength of a GPS satellite signal received from the GPS satellite and, for example, is represented as an index value of a C/N ratio (Carrier to Noise ratio). In addition, the measurement reliability 975 is an index value that represents the reliability of the measurement information 973 acquired for the GPA satellite.

FIG. 9 is a diagram showing an example of the data stored in the photographed image DB 100. In the photographed image DB 100, a data file name 101 of a photographed image, photographing date and time 103 of the photographed image, the photographing direction 105 of the photographed image, a calculated location 107 calculated as the location of the digital camera 3 at the photographing time of the photographed image, and a facility name 109 that is the name of a facility, in which the calculated location 107 is included, are stored in association with one another. In a case where only a photographing operation is performed, but the photographed place analyzing process is not performed, a state is formed on the photographed image in which the calculated location 107 and the facility name 109 are not associated with each other.

4. Flow of Process

Figure 10:
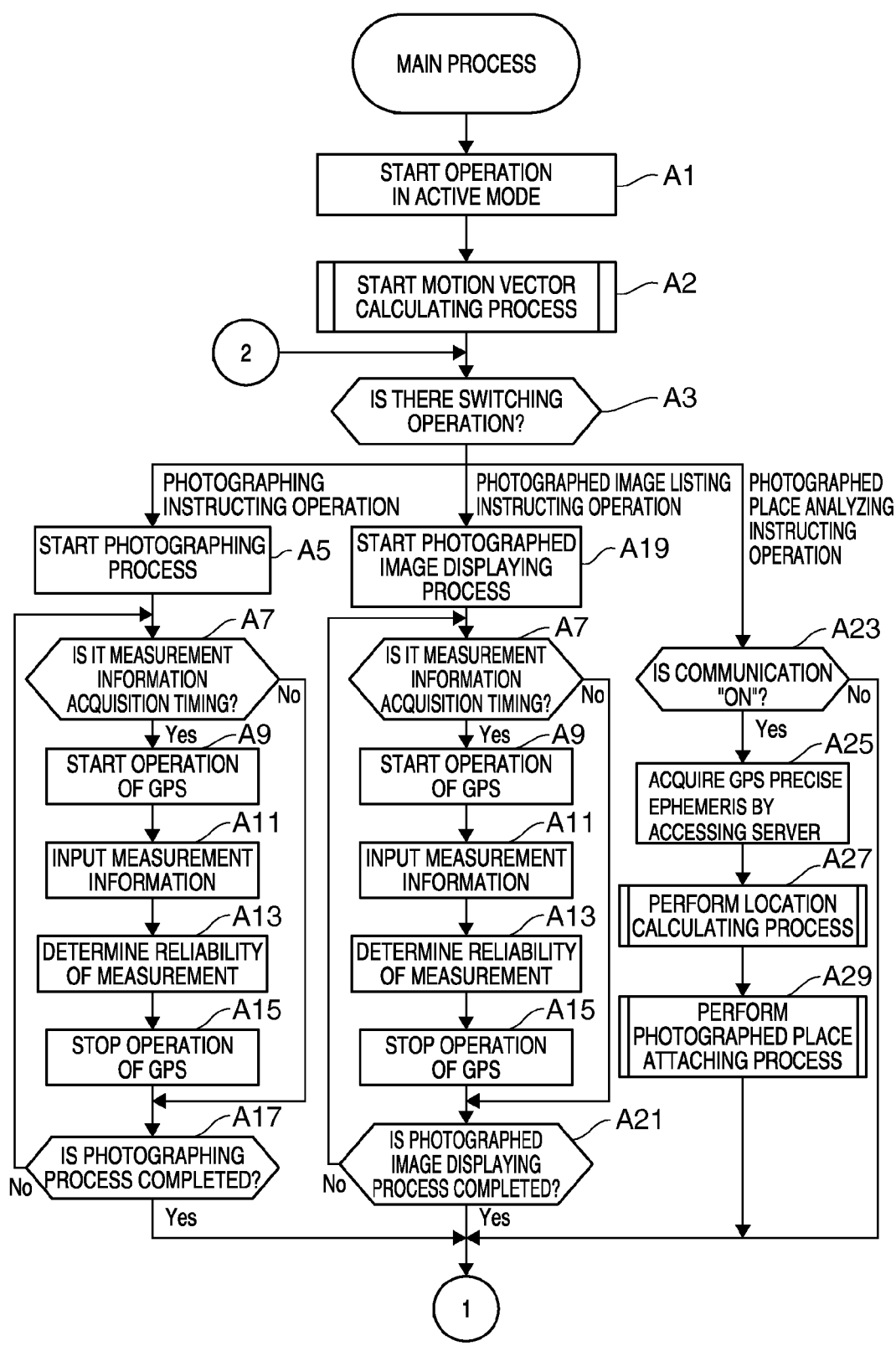
FIG. 10 is a flowchart showing the flow of a main process.
Figure 11:
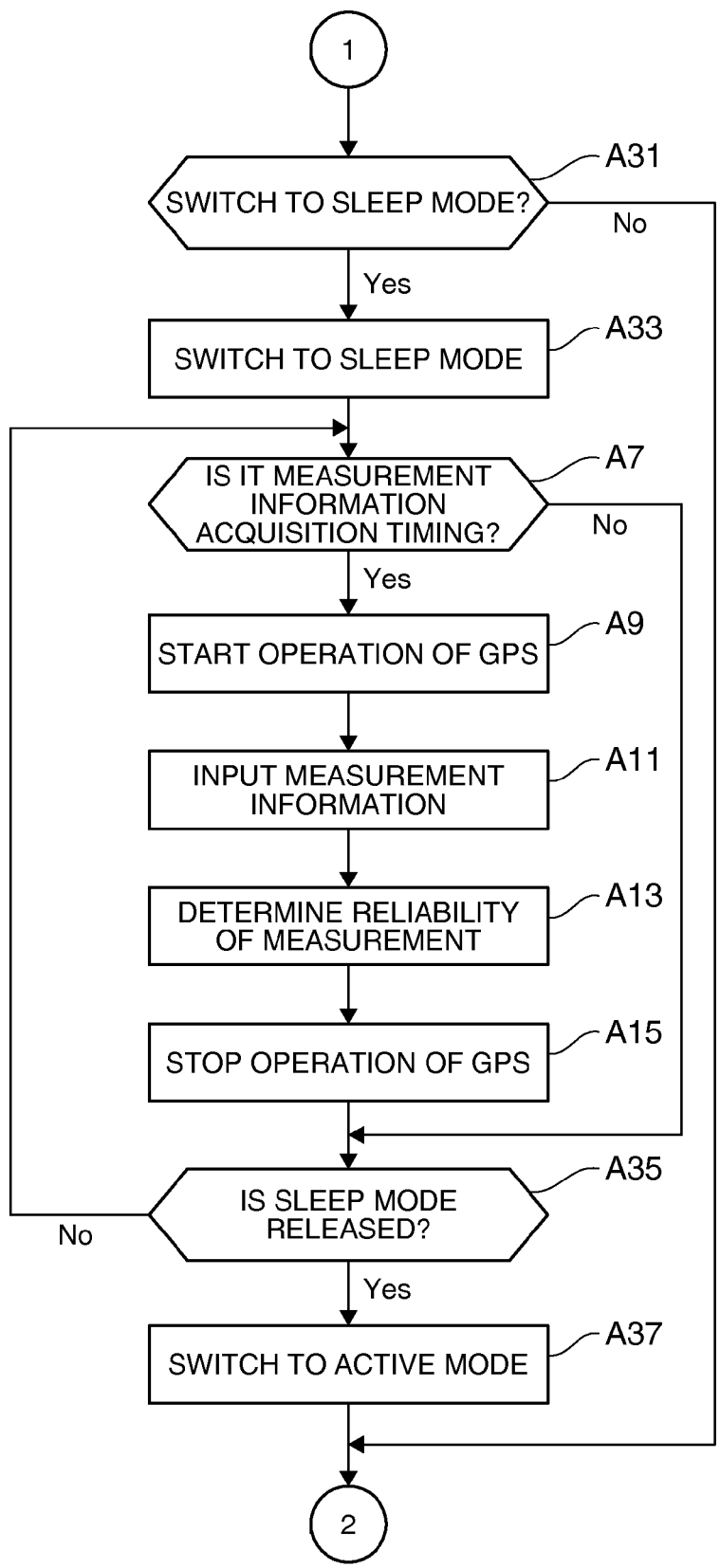
FIG. 11 is a flowchart showing the flow of the main process.

FIGS. 10 and 11 are flowcharts representing the flow of a main process that is performed in the digital camera 3 by reading out and executing the main program 91 stored in the storage unit 90 by using the processing unit 10. The main process is a process that is performed after an initial power input to the digital camera 3.

First, the processing unit 10 starts the operation of the digital camera 3 in an active mode (Step A1). In this embodiment, a mode in which the digital camera 3 is operated to be able to perform a photographing function, a photographed image listing function, a photographed place analyzing function, and the like is described as the "active mode". On the other hand, an idle mode in which the above-described functions cannot be performed is described as a "sleep mode". The "sleep mode" is a mode in which the processing unit 10 is operated in a power-save state and can be regarded as a standby mode in which power is not turned off.

After the operation is started, the processing unit 10 starts a motion vector calculating process by reading out and executing the motion vector calculating program 911 that is stored in the storage unit 90 (Step A2). Thereafter, the motion vector calculating process is performed in a resident manner, and the calculation of a motion vector is continuously performed.

Figure 12:
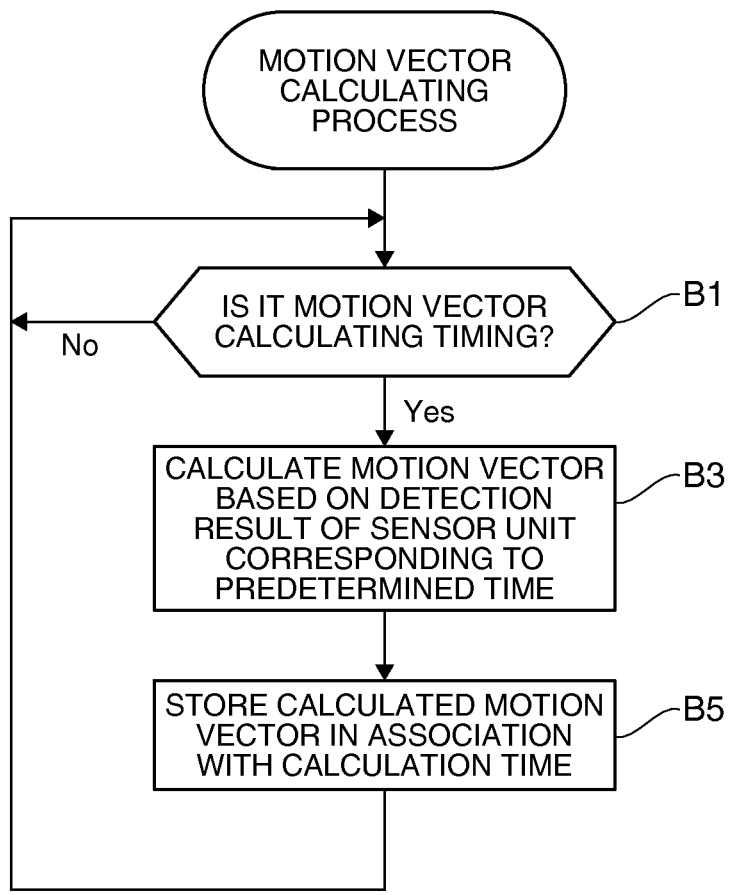
FIG. 12 is a flowchart showing the flow of a motion vector calculating process.

FIG. 12 is a flowchart showing the flow of the motion vector calculating process.

First, the processing unit 10 determines whether it is a motion vector calculating timing (Step B1). The motion vector calculating timing is a timing at a time interval that is longer than a detection time interval of the sensor unit 30.

Then, when it is determined as the motion vector calculating timing (Step B1: Yes), the processing unit 10 calculates a motion vector based on a detection result of the sensor unit 30 corresponding to a predetermined time (Step B3). The magnitude of the motion vector is calculated by integrating a detection result of the acceleration sensor 31. In addition, the direction of the motion vector is calculated by using an integral value of a detection result of the gyro sensor 33 and a detection result of the azimuth sensor 35.

Thereafter, the processing unit 10 stores the motion vector 963 calculated in Step B3 in the motion vector data 96 of the storage unit 90 in association with the calculation time 961 (Step B5). Then, the processing unit 10 returns the process to Step B1 and repeatedly performs the above-described process.

After the process is returned to the main process shown in FIG. 10, and the motion vector calculating process is started, the processing unit 10 determines the switching operation of the digital camera 3 that is performed through the operation unit 40 (Step A3). Then, when the switching operation is determined to be a photographing instructing operation (Step A3: photographing instructing operation), the processing unit 10 starts a photographing process (Step A5).

In particular, the processing unit 10 transits to a photographing mode and displays a finder image in the front direction of the digital camera 3 on the display unit 50. Then, in a case where a shutter operation is performed through the operation unit 40, the processing unit 10 allows the imaging unit 70 to photograph an image and stores data 101 of the photographed image in the photographed image DB 100 in association with photographed date and time 103. In addition, the processing unit 10 calculates the photographing direction 105 based on the detection results of the gyro sensor 33 and the azimuth sensor 35 and stores the photographing direction in the photographed image DB 100.

In addition, in the photographing process a hand-shake correcting process may be appropriately performed. For example, the hand-shake correcting process may be performed by using an optical correction method such as a lens shifting method, an image sensor shifting method or a lens unit swing method based on the detection result of the gyro sensor 33.

Thereafter, the processing unit 10 determines whether it is an acquisition timing for measurement information (Step A7). Then, when the acquisition timing is determined (Step A7: Yes), the processing unit 10 starts the operation of the GPS reception unit 20 (Step A9). In this embodiment, the acquisition and the storage of intermittent measurement information are realized by using a so-called always-tracking method in which the measurement information is acquired by regularly starting the operation of the GPS reception unit 20.

Thereafter, the processing unit 10 receives the measurement information 973 from the GPS reception unit 20 as input (Step A11) and determines the reliability of the measurement information 973 (Step A13). To be more specific, the processing unit 10 receives the signal strength 974 from the GPS reception unit 20 as input and determines the measurement reliability 975 of the measurement information 973 by referring to the measurement reliability determining table 93 that is stored in the storage unit 90. Then, the processing unit 10 stores the measurement information in the measurement data 97 for each satellite, which is included in the storage unit 90, in association with the above-described information.

Thereafter, the processing unit 10 stops the operation of the GPS reception unit 20 (Step A15). Then, the processing unit 10 determines whether the photographing process is to be completed (Step A17). When the photographing process is determined not to be completed (Step A17: No), the process is returned to Step A7. On the other hand, when the photographing process is determine to be completed (Step A17: Yes), the photographing process is completed, and the process proceeds to Step A31.

On the other hand, when the switching operation is determined to be a photographed image listing instructing operation in Step A3 (Step A3: photographed image listing instructing operation), the processing unit 10 starts a photographed image displaying process (Step A19). In other words, the process proceeds to the photographed image listing mode, and photographed image data of the data file name 101 stored in the photographed image DB 100 is read out and displayed on the display unit 50 in accordance with a user's selection operation through the operation unit 40. At this time, for example, the photographing date and time 103, the photographing direction 105, and the facility name 109 that are associated with the photographed image are displayed together. In addition, the location coordinates representing the calculated location 107 may be additionally displayed.

Thereafter, the processing unit 10 performs the process of Steps A7 to A15. Then, the processing unit 10 determines whether or not the photographed image displaying process is to be completed (Step A21). When the photographed image displaying process is determined not to be completed yet (Step A21: No), the process is returned to Step A7 after Step A19. On the other hand, when the photographed image displaying process is determined to be completed (Step A21: Yes), the processing unit 10 completes the photographed image displaying process, and the process proceeds to Step A31.

When the switching operation is determined to be a photographed place analyzing instructing operation in Step A3 (Step A3: photographed place analyzing instructing operation), the processing unit 10 determines whether the communication state of the communication unit 60 is "ON" (Step A23). When the communication state is determined to be "OFF" (Step A23: No), the process proceeds to Step A31.

On the other hand, when the communication state is determined to be "ON" (Step A23: Yes), the processing unit 10 acquires the GPS Precise Ephemeris 94 by accessing the server 2 and stores the GPS Precise Ephemeris in the storage unit 90 (Step A25). Then, the processing unit 10 performs the location calculating process in accordance with the location calculating program 913 that is stored in the storage unit 90 (Step A27).

Figure 13:
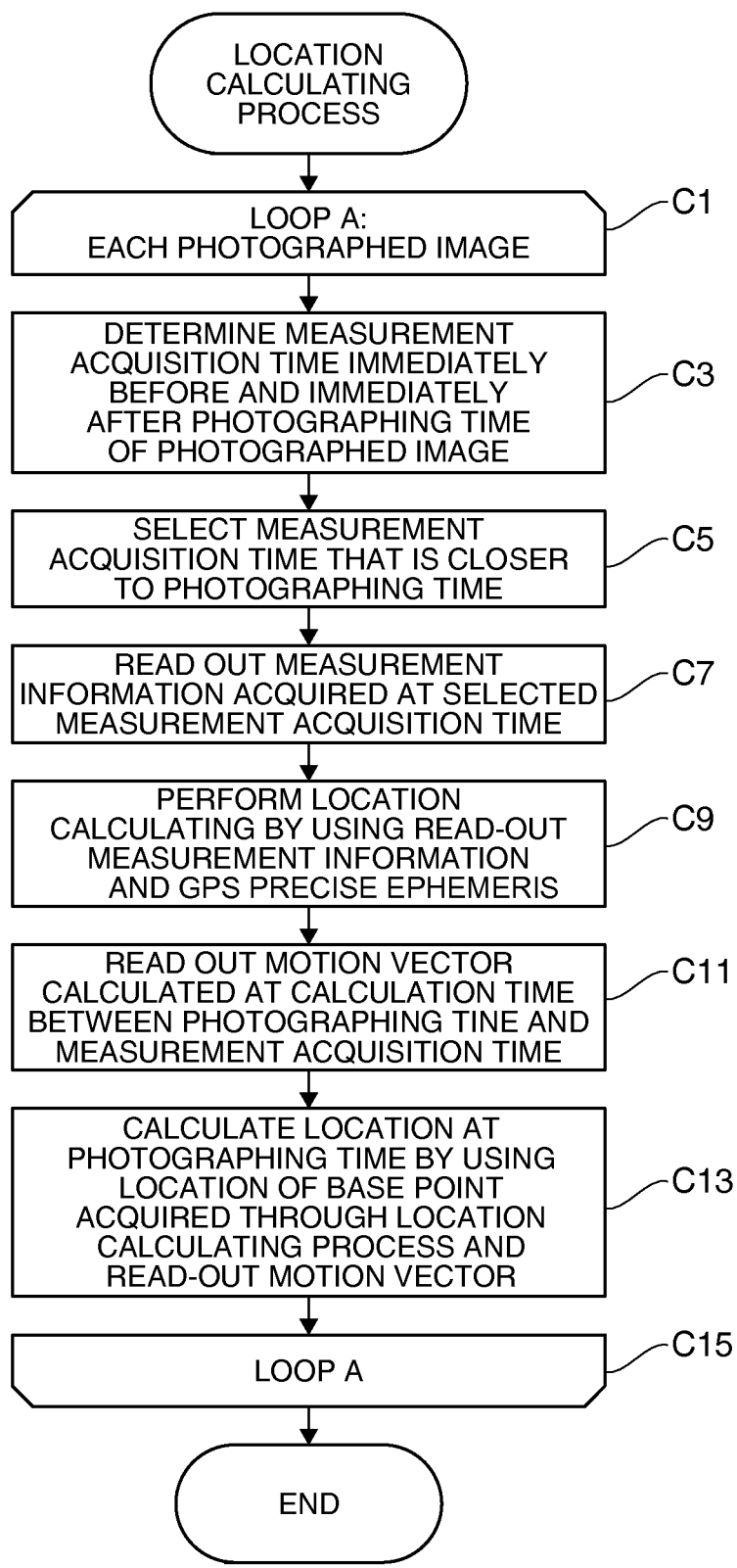
FIG. 13 is a flowchart showing the flow of a location calculating process.

FIG. 13 is a flowchart showing the flow of the location calculating process. First, the processing unit 10 performs the process of a loop A for each photographed image that is a target for analyzing a photographed place (Steps C1 to C15).

In the process of loop A, the processing unit 10 determines the measurement acquisition time 972 immediately before and immediately after the photographing time of the photographed image by referring to the measurement data 97 for each satellite (Step C3). Then, the measurement acquisition time closer to the photographing time of the photographed image is selected from the measurement acquisition time immediately before the photographing time and the measurement acquisition time immediately after the photographing time (Step C5), and the measurement information 973 acquired at the selected measurement acquisition time 972 is read out from the measurement data 97 for each satellite, which is included in the storage unit 90 (Step C7).

Thereafter, the processing unit 10 performs a location calculating process for calculating the location of the base point by using the measurement information 973 read out in Step C7 and the GPS Precise Ephemeris 94 stored in the storage unit 90 (Step C9).

Meanwhile the processing unit 10 reads out a motion vector 963 that is calculated at calculation time 961 between the photographing time of the photographed image and the measurement acquisition time selected in Step C5 from the motion vector data 96 of the storage unit 90 (Step C11).

Then, the processing unit 10 calculates the location of the digital camera 3 at the photographing time by using the location of the base point calculated in Step C9 and the motion vector read out in Step C11 (Step C13). Then, the processing unit 10 advances the process to a next photographed image.

After performing the process of Steps C3 to C13 for all the photographed image as targets for analyzing a photographed place, the processing unit 10 completes the process of the loop A (Step C15). Then, the processing unit 10 completes the location calculating process.

Returning back to the main process represented in FIG. 10, after performing the location calculating process, the processing unit 10 performs a photographed place attaching process (Step A29). To be more specific, a facility name that includes the location coordinates of the calculated location is specified by comparing and checking the calculated location acquired in the location calculating process and the map data 92 of the storage unit 90. Then, the processing unit 10 stores the specified facility name 109 in the photographed image DB 100 in association with the photographed image.

After performing the process of Steps A17, A21, or A29, the processing unit 10 determines whether the mode is switched to the sleep mode (Step A31). In other words, it is determined whether or not an instructing operation for setting the digital camera 3 to the sleep mode is performed by the user through the operation unit 40. Then, when the processing unit 10 determines to switch the mode to the sleep mode (Step A31: Yes), the mode is switched to the sleep mode from the active mode (Step A33), and then the process of Steps A7 to A15 is performed.

Thereafter, the processing unit 10 determines whether or not the sleep mode is released (Step A35). In other words, it is determined whether or not an instructing operation for switching the mode to the active mode is performed by the user through the operation unit 40.

When the sleep mode is determined not to be released (Step A35: No), the processing unit 10 returns the process back to the next step A7 of Step A33. On the other hand, when the sleep mode is determined to be released (Step A35: Yes), the processing unit 10 shifts the mode to the active mode (Step A37). Then, the process is returned back to Step A3.

5. Operations and Advantages

In the digital camera 3, the measurement acquisition section 21 intermittently performs the first process of acquiring the measurement information by receiving GPS satellite signals from the GPS satellites and storing the acquired measurement information in the storage unit 90 in association with the acquisition time. Meanwhile the processing unit 10 continuously performs the second process of calculating a motion vector by using the detection result of the sensor unit 30 and storing the calculated motion vector in the storage unit 90 in association with the calculation time. Then, the processing unit 10 calculates the location at the photographing time by using the measurement information acquired at acquisition time that is closest to the photographing time and motion vectors calculated from the acquisition time to the photographing time.

The measurement information is intermittently acquired and is stored in the storage unit 90, and the motion vectors are continuously calculated and are stored in the storage unit 90. Then, the location of the base point is acquired by using the measurement information acquired at acquisition time that is closest to the photographing time, and a relative location with respect to the location of the base point is calculated by using motion vectors calculated between the acquisition time and the photographing time. This is not a method in which calculation of the location is completed at the time of photographing but a new method in which information used for location calculation is stored at the time of photographing, and the photographing location is calculated later.

In addition, in this embodiment, the digital camera 3 acquires the GPS Precise Ephemeris that is precise data of a satellite orbit of the GPS satellite by communicating with the server 2, and the GPS Precise Ephemeris is used for the location calculating process using the measurement information. Since the location is calculated by using precise satellite orbit data, the photographing location can be precisely acquired.

6. Modified Examples 6-1. Electronic Apparatus

In the above-described embodiment, an example in which an embodiment of the invention is applied to a digital camera as one type of the electronic apparatus has been described. However, an electronic apparatus to which an embodiment of the invention can be applied is not limited thereto. As an electronic apparatus having the same photographing function, for example, an embodiment of the invention is applied to a cellular phone or a PDA (Personal Digital Assistant), and the location at the time when the photographing process is performed by the electronic apparatus may be calculated. In addition, an embodiment of the invention can be applied to an electronic apparatus that does not have a photographing function.

6-2. Desired Time

In the description presented above, instead of calculating a location by setting the time at which the photographing process is performed by an electronic apparatus having a photographing function as desired time, the location may be calculated by setting different processing time as the desired time. For example, a location may be calculated by setting the time at which a calling process is performed or a mail transmission and reception process is performed by a cellular phone including a location calculating device as the desired time. In addition, in an electronic apparatus such as a PDA or a notebook computer that has a communication function, a location may be calculated by setting the time at which a communication process is performed as the desired time.

6-3. Satellite Positioning System

In the above-described embodiment, an example in which a GPS is used as a satellite positioning system has been described. However, another satellite positioning system such as a WAAS (Wide Area Augmentation System), a QZSS (Quasi-Zenith Satellite System), a GLONASS (GLObal NAvigation Satellite System), or a GALILEO may be used.

6-4. Read-Out of Measurement Information

In the above-described embodiment, the location of the base point has been described to be calculated by reading out the measurement information, which is acquired at the acquisition time closest to the photographing time, from the storage unit 90. However, the location of the base point may be calculated by reading out the measurement information in consideration of the measurement reliability as well. For example, the location of the base point may be calculated by reading out the measurement information, which is acquired at the measurement acquisition time having higher measurement reliability out of the measurement acquisition time before and after the photographing time, from the storage unit 90.

6-5. Location Calculation

Figures 14A, 14B:
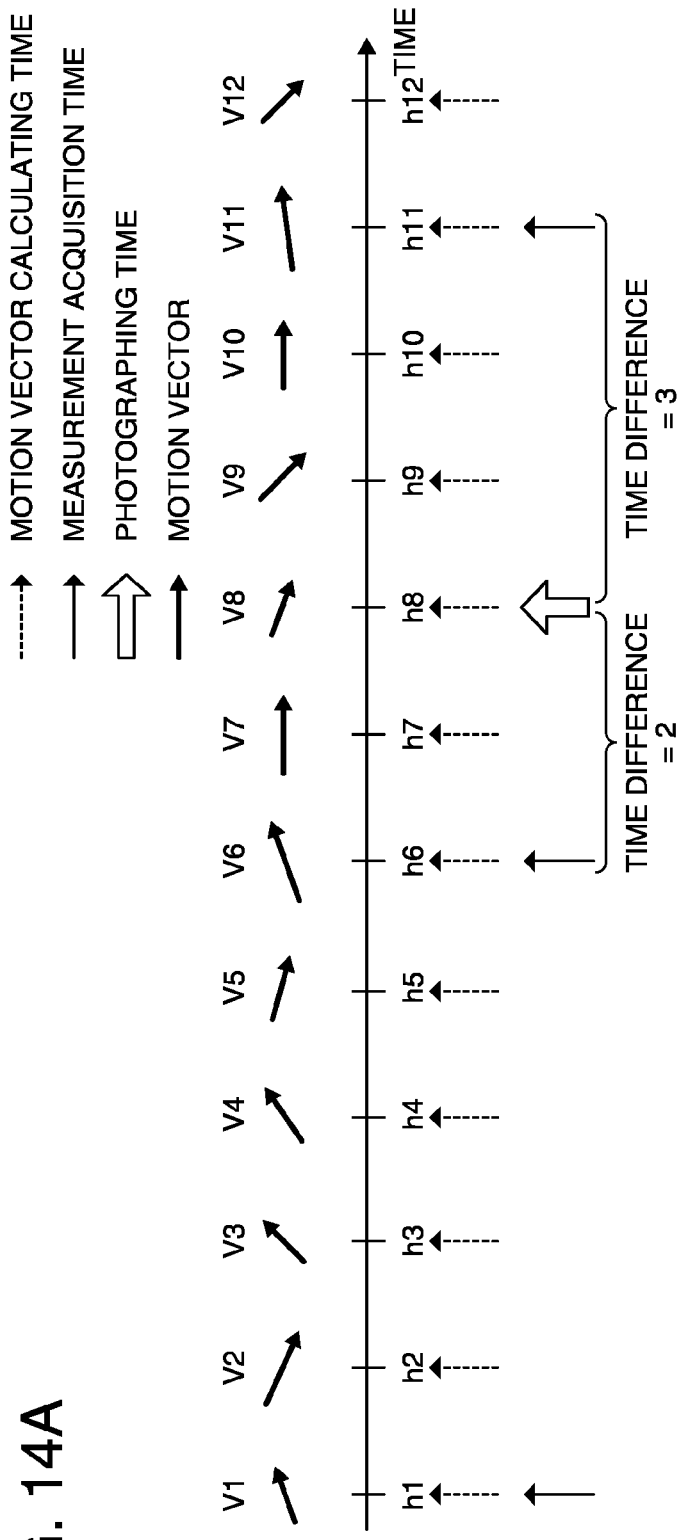
FIG. 14A is a conceptual diagram of time and motion vectors.
FIG. 14B is a schematic diagram illustrating location calculation.

FIGS. 14A and 14B are schematic diagrams illustrating the principle of location calculation in a modified example. The diagrams can be understood in the same manner as that in FIGS. 4A, 4B, 5A, and 5B. Here, it is assumed that the photographing time is "h8" in the description. First, the measurement acquisition time before and after the photographing time h8 is determined. Two moments of time h6 and h11 correspond to the measurement acquisition time before and after the photographing time h8. Here, for the convenience of the description, the time h6 is described as first measurement acquisition time, and the time h11 is described as second measurement acquisition time.

Next, a location is calculated by using the measurement information acquired at the first measurement acquisition time h6, and the location of the digital camera 3 at the first measurement acquisition time h6 is calculated and is set as the location of a first base point. Then, the motion vectors V6 and V7 calculated at the calculation time h6 and h7 are read out from the storage unit, and the location of the digital camera 3 at the photographing time h8 is calculated by using the location of the first base point and the read-out motion vectors V6 and V7. The location acquired as above is set as a first calculated location.

In addition, a location is calculated by using the measurement information acquired at the second measurement acquisition time h11, and the location of the digital camera 3 at the second measurement acquisition time h11 is calculated and is set as the location of a second base point. Then, the motion vectors calculated at the calculation time h8 to h10 are read out from the storage unit, and the location of the digital camera 3 at the photographing time h8 is calculated by using the location of the second base point and the motion vectors −V8 to −V10 that are acquired by inverting the read-out motion vectors V8 to V10. The location acquired as above is set as a second calculated location.

Thereafter, the final location at the photographing time is acquired by using the first calculated location and the second calculated location. To be more specific, the final location is acquired by performing a process of averaging the first calculated location and the second calculated location. As the averaging process, a simple arithmetic average may be used or a weighted average may be used. In a case where the weighted average is used, for example, the weighted average is acquired by performing weighting based on a time difference between the first measurement acquisition time and the photographing time and a time difference between the second measurement acquisition time and the photographing time.

For example, in FIGS. 14A and 14B, a time difference between the first measurement acquisition time h6 and the photographing time h8 is two units of time, and a time difference between the second measurement acquisition time h11 and the photographing time h8 is three units of time. It is understood that as the measurement information is acquired at the acquisition time having a smaller time difference from the photographing time, the precision of the calculated location increases. Accordingly, for example, a location that is acquired by internally dividing a segment joining the first calculated location and the second calculated location in the ratio of "2:3" is set as the final calculated location at the photographing time h8.

In addition, the weighted average may be acquired by performing weighting based on the measurement reliability as another embodiment. As the measurement reliability increases, the reliability of the measurement information increases, and the precision of the calculated location increases. Accordingly, it is appropriate that a weighting value is set to be higher for a location that is calculated by using measurement information having higher measurement reliability.

For example, it is assumed that the reliability of the measurement information at the first measurement acquisition time is 0.8, and the reliability of the measurement information at the second measurement acquisition time is 0.6. Here, the measurement reliability is a value in the range of "0" to "1", and measurement reliability having a higher value represents higher reliability of the measurement information. In this case, a location that is acquired by internally dividing a segment joining the first calculated location and the second calculated location at the ratio of 1:2 (=(1-0.8):(1-0.6)) is set as the final calculated location.

In addition, by performing weighted averaging using both a weight on the basis of a time difference between the measurement acquisition time and the photographing time and a weight on the basis of the measurement reliability that have been described above, the precision of location calculation can be further improved.

6-6. Method of Determining Measurement Reliability

In the above-described embodiment, the measurement reliability has been described to be determined based on the signal strength of a received GPS satellite signal. However, the measurement reliability may be determined based on a different index value. For example, the measurement reliability may be determined based on the reception environment of a GPS satellite signal. While the measurement reliability decreases in an indoor environment as the reception environment, the measurement reliability increases in an outdoor environment as the reception environment.

Furthermore, the measurement reliability may be determined based on the elevation angle of the GPS satellite. As the elevation angle of the GPS satellite increases, a high quality signal that is not easily influenced by a multi-path or the like is received, and accordingly, the measurement reliability increases. In addition, the measurement reliability may be determined based on a PDOP (Position Dilution Of Precision) value that is an index value of arrangement of a GPS satellite in the sky. As the PDOP value decreases, the arrangement of the GPS satellite in the sky is further improved, and accordingly, the measurement reliability increases. Such a condition may be set as the determination condition and be stored in the measurement reliability determining table 93 of the storage unit 90.

6-7. Speed Calculating Process

In the above-described embodiment, the description has been presented with focusing on the location calculating process. However, a speed calculating process may be similarly performed. A Doppler effect occurs due to the movement of the GPS satellite and the movement of the digital camera 3. The precise movement speed of the GPS satellite can be calculated based on the GPS Precise Ephemeris 94. In addition, the Doppler frequency can be calculated based on the reception frequency that is included in the measurement information. Accordingly, the movement speed of the digital camera 3 can be calculated by using a known calculation technique.

What is claimed is:

1. A location calculating method comprising:
    acquiring measurement information by receiving satellite signals from positioning satellites and storing the acquired measurement information in a storage unit in association with acquisition time;
    calculating movement information that includes a movement direction and a movement distance by using a detection result of a sensor unit that at least includes an acceleration sensor and storing the calculated movement information in the storage unit in association with calculation time; and
    calculating a past location corresponding to a desired time in the past when a predetermined process was performed by using at least the measurement information of which the acquisition time satisfies a predetermined proximity time condition and the movement information of which the calculation time is between the acquisition time of the measurement information and the given desired time, wherein the desired time is at a time different than the acquisition time of the measurement information.

2. The location calculating method according to claim 1, wherein the calculating of a location includes calculating the location at the desired time by acquiring a location of a base point by using the measurement information of which the acquisition time satisfies the proximity time condition and calculating a relative location with respect to the location of the base point by using the movement information.

3. The location calculating method according to claim 1, wherein the calculating of a location includes reading out the measurement information from the storage unit with the acquisition time immediately before or immediately after the desired time being set as the proximity time condition.

4. The location calculating method according to claim 1, wherein the calculating of a location includes reading out the measurement information that satisfies a predetermined high reliability condition from the storage unit as the measurement information of which the acquisition time satisfies the proximity time condition.

5. The location calculating method according to claim 1, wherein the desired time is time at which a predetermined process is performed.

6. The location calculating method according to claim 1, further comprising acquiring GPS Precise Ephemeris,
    wherein the positioning satellites are the GPS satellites, and
    wherein the calculating of a location is calculating the location by using the GPS Precise Ephemeris.

7. A location calculating device comprising:
    a first process performing unit that acquires measurement information by receiving satellite signals from positioning satellites and stores the acquired measurement information in a storage unit in association with acquisition time;
    a second process performing unit that calculates movement information that includes a movement direction and a movement distance by using a detection result of a sensor unit that at least includes an acceleration sensor and stores the calculated movement information in the storage unit in association with calculation time; and
    a location calculating unit that calculates a past location corresponding to a desired time in the past when a predetermined process was performed by using at least the measurement information of which the acquisition time satisfies a predetermined proximity time condition and the movement information of which the calculation time is between the acquisition time of the measurement information and the given desired time, wherein the desired time is at a time different than the acquisition time of the measurement information.

8. The location calculating method of claim 1, wherein the predetermined process was performed in response to receiving user input.

9. The location calculating device of claim 7, wherein the predetermined process was performed in response to receiving user input.

* * * * *